United States Patent
Lisart et al.

(10) Patent No.: US 7,609,568 B2
(45) Date of Patent: Oct. 27, 2009

(54) METHOD AND DEVICE FOR SECURING AN INTEGRATED CIRCUIT, IN PARTICULAR A MICROPROCESSOR CARD

(75) Inventors: Mathieu Lisart, Aix en Provence (FR); Nicolas Demange, Saint Maximin la Sainte Baume (FR)

(73) Assignee: STMicroelectronics S.A., Montrouge (FR)

( * ) Notice: Subject to any disclaimer, the term of this patent is extended or adjusted under 35 U.S.C. 154(b) by 277 days.

(21) Appl. No.: 11/493,865

(22) Filed: Jul. 25, 2006

(65) Prior Publication Data

US 2007/0033380 A1    Feb. 8, 2007

(30) Foreign Application Priority Data

Jul. 26, 2005    (FR)    .................................. 05 07912

(51) Int. Cl.
*G11C 7/18*    (2006.01)
(52) U.S. Cl. ................... 365/196; 365/205; 365/185.21
(58) Field of Classification Search ............ 365/189.01, 365/203, 205, 189.15, 196
See application file for complete search history.

(56) References Cited

U.S. PATENT DOCUMENTS

| | | | |
|---|---|---|---|
| 6,061,297 A * | 5/2000 | Suzuki ..................... | 365/238.5 |
| 6,278,783 B1 | 8/2001 | Kocher et al. | |
| 6,327,661 B1 | 12/2001 | Kocher et al. | |
| 6,381,699 B2 | 4/2002 | Kocher et al. | |
| 6,532,556 B1 | 3/2003 | Wong et al. .................. | 714/702 |
| 6,545,623 B1 * | 4/2003 | Yu ............................. | 341/155 |
| 6,801,464 B2 * | 10/2004 | Kawano ................ | 365/189.15 |
| 7,073,072 B1 * | 7/2006 | Salle .......................... | 713/193 |
| 2003/0048900 A1 | 3/2003 | Kim et al. | |

* cited by examiner

*Primary Examiner*—Vu A Le
*Assistant Examiner*—Han Yang
(74) *Attorney, Agent, or Firm*—Lisa K. Jorgenson; Robert Iannucci; Seed IP Law Group PLLC (57) ABSTRACT

A method processes parallel electrical signals, using parallel processing circuits that process successive cycles of electrical signals according to a rule for allocating electrical signals to the processing circuits. The method comprises, between the processing cycles, a step of modifying the rule for allocating electrical signals to the processing circuits, so that a processing circuit processes electrical signals of different ranks during different processing cycles. The method can be applied particularly to secure a memory during read phases of the memory and of an integrated circuit with a microprocessor using such a memory.

23 Claims, 3 Drawing Sheets

METHOD AND DEVICE FOR SECURING AN INTEGRATED CIRCUIT, IN PARTICULAR A MICROPROCESSOR CARD

BACKGROUND OF THE INVENTION

1. Field of the Invention

The present invention relates to the securing of integrated circuits, and in particular the protection of integrated circuits for chip cards against fraud.

The present invention more particularly relates to the securing of parallel signals processing circuits and particularly the securing of memory cells read circuits, in order to prevent fraudulent access to data stored in a memory.

2. Description of the Related Art

The memory cells read circuits, also called "sense amplifiers", are particularly vulnerable to fraudsters' attacks aiming at discovering data in a memory. Indeed, when sense amplifiers read memory cells, the mere observation of their activity (observation of electrical potentials) makes it possible to determine the value of data stored in memory cells currently being read. When combined with an error injection into the addresses applied to the memory, this technique allows the value of data stored in protected areas of the memory to be deduced.

The memories present in the integrated circuits of chip cards are particularly subjects to this type of attack since they contain confidential data (secret keys, passwords . . . ) that fraudsters want to know.

To counter this type of attack, it is known to cipher the data contained in the memory. However, this solution increases the duration of data processing cycles because it requires ciphering the data before writing them in the memory and then deciphering the data read out of the memory before being able to exploit them.

It is also known to implant memory cells on a semi-conductor substrate without following the usual manufacturing rules of integrated circuits, so that memory cells of successive addresses are not physically neighbours but randomly arranged.

However, when a binary word is read out of a memory, several memory cells are simultaneously read, each memory cell containing one bit of the binary word. Each memory cell of determined rank supplies an electrical signal which is processed by a sense amplifier of determined rank. There thus exists a static relation between the rank of a memory cell within a group of cells containing a binary word and the rank of the sense amplifier allocated to the memory cell reading, thanks to which the bits supplied by the sense amplifiers are arranged in a determined order corresponding to their rank within the binary word. Thus, fraudsters can observe the activity of the sense amplifiers, deduce from it the value of data currently being read and then find the address of the memory cells containing these data. Consequently, a random arrangement of memory cells and a random address allocation to the memory cells do not allow fraud attempts to be efficiently countered and only allow the fraudster's work to be made more complex.

BRIEF SUMMARY OF THE INVENTION

Thus, one embodiment of the present invention counters the techniques of hacking integrated circuits based on the observation of the activity of parallel electrical signals processing circuits.

One embodiment of the present invention counters the techniques of hacking a memory based on the observation of the activity of the sense amplifiers present in the memory.

One embodiment of the present invention is based on the observation that the parallel processing circuits like sense amplifiers are vulnerable to fraudsters' attacks, if a relationship or static "allocation rule" exists between the electrical signals to be processed, for example the electrical signals supplied by the memory cells, and the processing circuits.

Such a static allocation rule exists in various types of devices different from the memories, where a high level of security can also be desired, for example an analog-to-digital converter comprising several analog-to-digital conversion blocks, each receiving an analog signal and each supplying a digital signal corresponding to the analog signal received, or a monitoring circuit comprising parallel monitoring blocks, each receiving a signal to be monitored and switching into an error state when the signal monitored has a determined feature, for example a level of voltage or current above a determined threshold, etc . . .

Thus, one embodiment of the present invention provides a method for processing parallel electrical signals each having a determined rank, comprising successive cycles of electrical signals processed by parallel processing circuits according to a rule for allocating electrical signals to the processing circuits, and, between processing cycles, a step of modifying the rule for allocating electrical signals to the processing circuits, so that a processing circuit processes electrical signals of different ranks during different processing cycles.

According to one embodiment, the allocation rule is randomly or pseudo-randomly modified every T processing cycles in order not to be predictable, T being a constant or variable integer superior or equal to 1.

According to one embodiment, the number of processing circuits is equal to the number of electrical signals to be processed, each processing circuit being allocated to the processing of one electrical signal only at each processing cycle, without processing circuits redundancy.

According to one embodiment, the step of modifying the allocation rule comprises a step of applying a first permutation to at least one part of the electrical signals to be processed.

According to one embodiment, the processing circuits supply output signals, each having a determined rank, and the step of modifying the allocation rule comprises a step of applying a second permutation to the output signals, to organize the output signals in a predetermined invariant order.

According to one embodiment, a permutation is performed by means of multiplexers.

According to one embodiment, the method comprises steps of defining groups of electrical signals and groups of processing circuits, each group of processing circuits being allocated to the processing of a group of signals, defining, within each group of electrical signals, a rule for allocating each electrical signal of the group to one processing circuit of the group of processing circuits allocated to the group of signals, and modifying the rule for allocating electrical signals within at least one group of signals between two different processing cycles.

According to one embodiment, the number of processing circuits in each group of processing circuits is equal to the number of electrical signals in each group of electrical signals, each group of processing circuits being allocated to the processing of a group of electrical signals without redundancy of processing circuits.

According to one embodiment, the method is applied to cycles for reading memory cells selected within a memory, the electrical signals to be processed are a function of the state of conductivity of the selected memory cells, the processing circuits are memory cell read circuits, arranged to read the selected memory cells in parallel, and supply a binary output signal each, representative of the state of conductivity of the memory cell to which it is linked, and the rule for allocating electrical signals to the processing circuits defines electrical paths linking the selected memory cells to the read circuits.

According to one embodiment, the method comprises steps of providing permutable electrical paths between the memory cells and the read circuits, applying a first permutation to at least one part of the electrical paths, to modify the order in which the selected memory cells are linked to the read circuits, and applying a second permutation to the output signals supplied by the read circuits, so that the output signals are supplied in a predetermined invariant order.

One embodiment of the present invention also relates to a processing device for performing successive cycles for processing parallel electrical signals each having a determined rank, comprising parallel processing circuits each comprising an input to receive one of the electrical signals to be processed according to a rule for allocating electrical signals to the processing circuits, a first permutation circuit for applying a permutation to at least one part of the electrical signals to the input of the processing circuits and modifying the rule for allocating electrical signals to the processing circuits, and means for controlling the first permutation circuit, to modify the allocation rule between successive processing cycles.

According to one embodiment, the device comprises a number of processing circuits equal to the number of electrical signals to be processed, each processing circuit being allocated to the processing of one electrical signal only at each processing cycle, without redundancy of processing circuits.

According to one embodiment, the controlling means supply a permutation set point to the permutation circuit.

According to one embodiment, the controlling means modify the set point randomly or pseudo-randomly every T processing cycles, T being a constant or variable integer, superior or equal 1.

According to one embodiment, the processing circuits supply output signals of determined ranks, and the device comprises a second permutation circuit for applying to the output signals a permutation such that the output signals are supplied in a predetermined invariant order.

According to one embodiment, the first and/or second permutation circuit(s) comprise(s) multiplexers.

According to one embodiment, the first permutation circuit comprises juxtaposed permutation blocks, each permutation block being arranged to allocate the electrical signals of a group of electrical signals to a group of processing circuits allocated to the processing of the group of electrical signals, and the controlling means are arranged to modify the allocation rule applied by at least one block between two different processing cycles.

According to one embodiment, the number of processing circuits in each group of processing circuits is equal to the number of electrical signals in each group of electrical signals to be processed, each group of processing circuits being allocated to the processing of a group of electrical signals without redundancy of processing circuits.

One embodiment of the invention also relates to a memory comprising memory cells, means for selecting memory cells, and a processing device according to an embodiment of the invention wherein the electrical signals to be processed are a function of the state of conductivity of selected memory cells, the processing circuits are memory cell read circuits, arranged to read in parallel selected memory cells and to supply a binary output signal each, representative of the state of conductivity of the memory cell to which it is linked, and the rule for allocating electrical signals to the processing circuits defines electrical paths linking the selected memory cells to the read circuits.

According to one embodiment, the memory comprises electrical paths linking the selected memory cells to the read circuits, a first permutation circuit for permuting the paths linking the memory cells and the read circuits, and a second permutation circuit for applying a permutation to the output signals supplied by the read circuits, so that the output signals are supplied in a predetermined invariant order.

One embodiment of the invention provides a method for reading data from a memory comprising the steps of selecting a plurality of memory cells to be read, each memory cell supplying an electrical signal that represents the data value of that cell, routing each electrical signal to a respective read circuit according to a routing rule, and modifying the routing rule between read cycles.

BRIEF DESCRIPTION OF THE SEVERAL VIEWS OF THE DRAWINGS

These and other advantages and features of the present invention will be presented in greater detail in the following description of the invention in relation with, but not limited by the following figures.

DETAILED DESCRIPTION OF THE INVENTION

Figure 1:
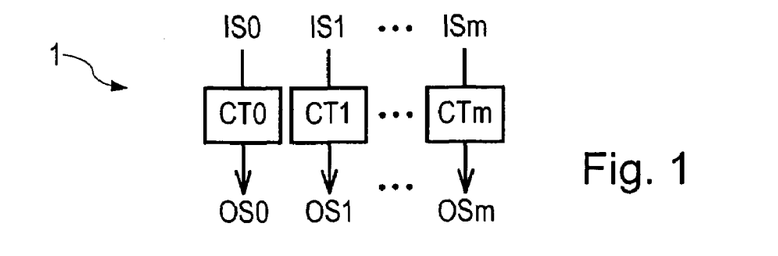
FIG. 1 shows, in blocks form, a standard device for processing parallel electrical signals.

FIG. 1 shows a standard device 1 ensuring the processing of parallel electrical signals IS0-Ism. The device comprises parallel processing circuits CT0, CT1, . . . CTm, each being of a determined rank and comprising an input to receive one of the electrical signals IS0-Ism, the latter also being of a determined rank. The processing circuits perform the same processing function and the electrical signals IS0-ISm are processed in parallel during successive processing cycles between which they change values or are supposed to change values. At the end of each processing cycle, each processing circuit supplies an output signal OS0-OSm whose rank corresponds to the rank of the input signal it receives.

In such a device, the electrical signal received by each processing circuit is determined by a static allocation rule defining the electrical paths bringing the electrical signals IS0-ISm to the processing circuits CT0-CTm. The drawing shown in FIG. 1 does not comprise interlacing, a circuit CTi of determined rank "i" (0, 1, . . . m) ensuring the processing of a signal ISi of same rank. The allocation rule could also comprise a static interlacing of the electrical paths but, for the reasons explained above, this precaution would not be enough to efficiently counter the fraud techniques based on the observation of the activity of processing circuits.

Figure 2:
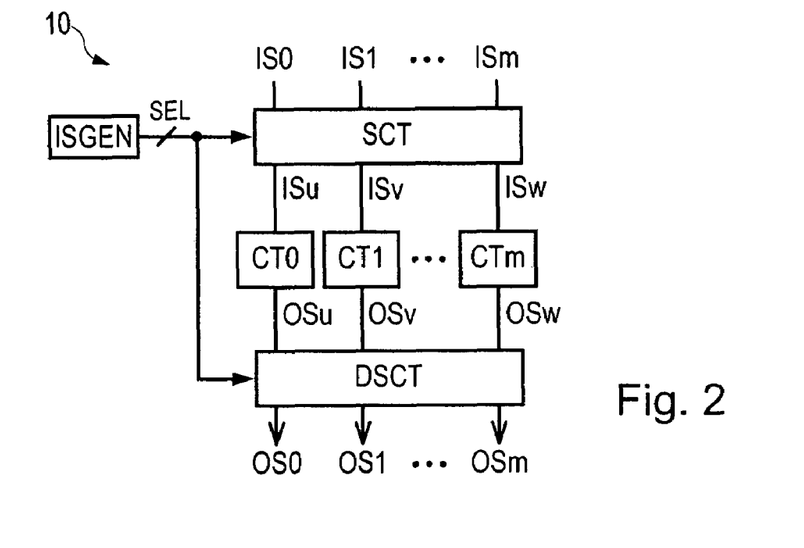
FIG. 2 shows, in blocks form, a device according to the invention for processing electrical signals, comprising permutation circuits.

FIG. 2 shows a processing device 10 according to the invention. The device 10 ensures the processing of the same electrical signals IS0-ISm as the device 1 shown in FIG. 1 and comprises the same processing circuits CT0, CT1., ...CTm. The device 10 is different from the device 1 in that it comprises means for dynamically modifying the rule for allocating signals IS0, IS1, ... ISm to the processing circuits CT0, CT1, ... CTm.

Here, these means comprise a first permutation circuit SCT and a circuit ISGEN supplying a control signal SEL to the permutation circuit SCT. The circuit SCT determines the electrical paths bringing the signals IS0-ISm to the processing circuits CT0, CT1, ... CTm according to an allocation rule varying with the control signal SEL, the latter being modified every T processing cycles by the circuit ISGEN, T being an integer superior or equal to 1. Thus, every T processing cycles, the electrical paths bringing the signals IS0-ISm to the processing circuits CT0-CTm are totally or partly modified, so that a processing circuit CTi of rank i can process an electrical signal of rank I' different from i during a processing cycle, and then process an electrical signal of rank I" different from I' during another processing cycle.

In FIG. 2, it thus appears that the permutation circuit SCT receives the electrical signals IS0, IS1, ... ISm of ranks 0, 1, ... m and supplies to the processing circuits CT0, CT1, ... CTm electrical signals ISu, ISv, ... ISw of ranks u, v, ... w respectively, not necessarily corresponding to 0, 1, ... m (u, v, ... w being integers comprised between 0 and m). On the other hand, the processing circuits supply output signals OSu, OSv, ... OSw of the same rank as the electrical signals received ISu, ISv, ... ISw.

The control signal SEL is preferably refreshed randomly or pseudo-randomly every T processing cycles so that the modifications of the allocation rule are not predictable.

In other respects, it can be worth modifying regularly or randomly the frequency of modification of the allocation rule. In that case, the parameter T is a variable which can be random or pseudo-random itself.

According to a second embodiment of the invention, the processing device 10 comprises a second permutation circuit DSCT, arranged at the output of the processing circuits CT0-CTm. The circuit DSCT applies a permutation to the output signals OSu, OSv, ... OSw supplied by the processing circuits so that these signals are reorganized in a predetermined invariant order.

The order desired for the presentation of output signals can be the same as the order into which the electrical signals IS0, IS1, ... ISm are received by the permutation circuit SCT, as shown in FIG. 2. In that case, the permutation circuit DSCT applies to the output signals OSu, OSv, ... Osw a permutation which is the reverse of the one applied by the permutation circuit SCT, so that, at the output of the circuit DSCT, the output signals OS0, OS1, ... OSm are in the same order as the input signals IS0, IS1, ... ISm, OS0 being the output signal corresponding to the input signal IS0, OS1 the output signal corresponding to the input signal IS1, etc., OSm being the output signal corresponding to the input signal ISm.

The order desired for the presentation of output signals, though being invariable, can also be different from the order into which the electrical signals IS0, IS1, ... ISm are received. In that case, the permutation circuit DSCT applies to the output signals OSu, OSv, ... Osw a first permutation which is the reverse of the one applied by the permutation circuit SCT and then a second (invariable) permutation to obtain the desired order.

In both cases, the permutation performed by the circuit DSCT compensates for (neutralizes) the one performed by the circuit SCT. To that purpose, the second permutation circuit DSCT can be controlled by the same control signal SEL as the permutation circuit SCT.

Those skilled in the art will note that the second embodiment of the invention is not necessary when the processing circuits CT0-CTm supply output signals whose rank is unimportant, or when the signals to be processed include for example an identification tag which is copied out by the processing circuits into the output signals (for example in the case of a parallel processing of digital signals comprising an identification field).

Thanks to the method described above, a simple observation of the activity of the processing circuits CT0-CTm is not enough to determine the relationship between the output signals and the input signals, because this relationship changes every T processing cycles according to a rule which is unknown to the fraudster and is preferably random or pseudo-random as suggested above.

Figure 3:
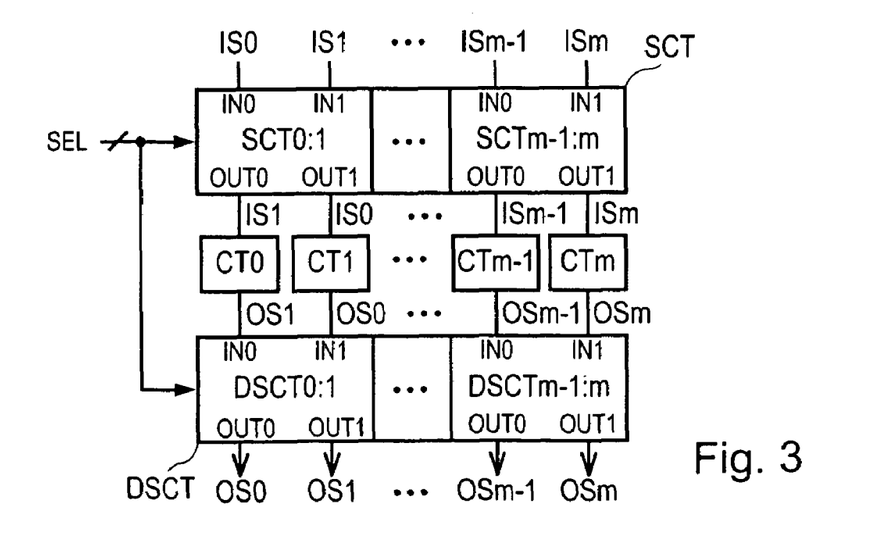
FIG. 3 schematically shows an embodiment of the permutation circuits of FIG. 2, comprising a juxtaposition of permutation blocks.

FIG. 3 shows an embodiment of the device according to the invention wherein the permutation circuits SCT, DSCT are formed by the juxtaposition of permutation blocks SCT0:1 to SCTm−1:m, respectively DSCT0:1 to DSCTm−1:m, each having a number of inputs and outputs inferior to the total number of electrical signals IS0-ISm.

To that purpose, the input signals IS0-ISm, the output signals OS0-Osm and the processing circuits are distributed among several groups of input signals, as many groups of output signals, and as many groups of processing circuits. Each block SCT0:1-SCTm−1:m comprises inputs for receiving a group of input electrical signals, outputs connected to the inputs of a group of processing circuits CT0-CTm, and applies between its inputs and its outputs a permutation function of the control signal SEL. Likewise, each permutation block DSCT0:1-DSCTm−1:m comprises inputs connected to the outputs of a group of processing circuits CT0-CTm, for receiving a group of output signals supplied by the group of processing circuits, and outputs for copying out these output signals after applying to them a permutation which is a function of the control signal SEL.

To each permutation block SCT0:1-SCTm−1:m corresponds a permutation block DSCT0:1-DSCTm−1:m and vice versa. A permutation block SCT0:1-SCTm−1:m and the corresponding permutation block DCT0:1-DSCTm−1:m apply opposite permutations to the input and output signals of the corresponding processing circuits, so that each output signal is presented according to an invariable rank independent from the variations of the allocation rule (here, a rank identical to the rank of the corresponding input signal).

In one embodiment as shown in FIG. 3, all the blocks SCT0:1-SCTm−1:m and DSCT0:1-DSCTm−1:m are identical and have the same number of inputs and outputs, here two inputs and two outputs.

Thus, each permutation block SCT0:1-SCTm−1:m, DSCT0:1-DSCTm−1:m comprises two inputs IN0, IN1, two outputs OUT0, OUT1 and is controlled by a bit of the control signal SEL which is here a binary word. The control bit that drives a permutation block SCT0:1-SCTm−1:m is also applied to the corresponding permutation block DSCT0:1-DSCTm−1:m.

Each permutation block SCT0:1-SCTm−1:m receives on its inputs IN0, IN1 two signals to be processed among the signals IN0-INm and applies or not a permutation to these signals according to the value of the control bit, and supplies on its outputs OUT0, OUT1 the two signals in the initial order or in a reverse order.

Likewise, each permutation block DSCT0:1-DSCTm-1:m receives on its inputs IN0, IN1 two output signals among the signals OS0-OSm supplied by the processing circuits CT0-CTm and applies or not a permutation to these signals according to the value of the control bit, to supply on its outputs OUT0, OUT1 the two signals in the initial order or in a reverse order.

For example, the block SCT0:1 supplies the signals IS0, IS1 to the processing circuits CT0, CT1 in an order which is a function of the first bit of the signal SEL, and the corresponding block DSCT0:1, driven by the same control bit, copies out the output signals OS0, OS1 supplied by the processing circuits CT0, CT1 so that they present in the initial order of the signals IS0, IS1. Thus, assuming that the block SCT0:1 permutes the input signals IS0, IS1, as shown in the Figure, the block DSCT0:1 also permutes the output signals OS0, OS1 which are then reorganized in accordance with the ranks of the input signals.

Likewise, each permutation block after SCTi:i+1, and until the last block SCTm-1:m, supplies the signals ISi, ISi+1 to processing circuits CTi, CTi+1 in an order which is a function of the control bit of the signal SEL allocated to the control of this block, and the corresponding block DSCTi:i+1, driven by the same control bit, copies out the output signals OSi, OSi+1 supplied by the processing circuits CTi, CTi+1 so that they present in the initial order of the signals ISi, ISi+1.

Figure 4A:
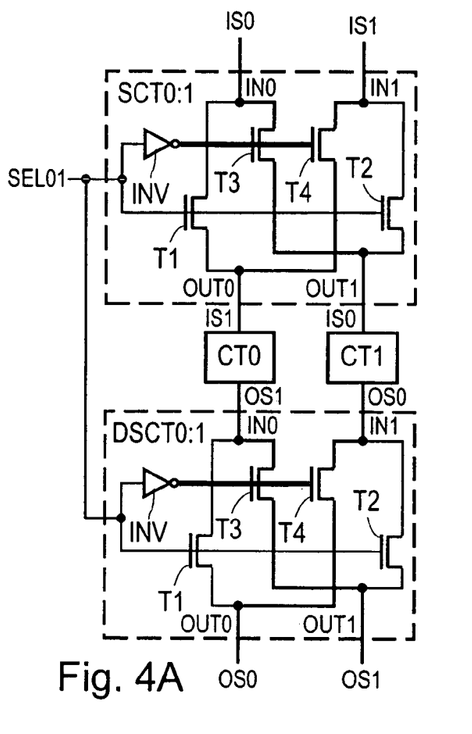
FIGS. 4A and 4B show an embodiment of the permutation blocks of FIG. 3.
Figure 4B:
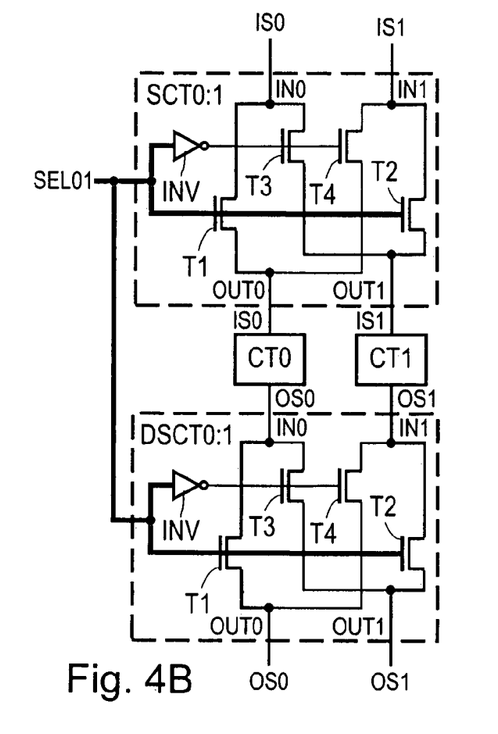

FIGS. 4A and 4B show an embodiment of two permutation blocks, for example the blocks SCT0:1, DSCT0:1, the other blocks being identical.

Each permutation block SCT0:1 or DSCT0:1 comprises four NMOS transistors T1-T4. The gates of transistors T1 and T2 are controlled by a bit SEL01 of the control signal SEL and the gates of transistors T3, T4 are controlled by the reversed bit SEL01 supplied by a Not gate inverter INV. The input IN0 of the permutation block is connected to the drain terminals of transistors T1 and T3, and the input IN1 is connected to the drain terminals of the transistors T2 and T4. The source terminals of the transistors T1 and T4 are connected to the output OUT0 of the permutation block, and the source terminals of the transistors T2 and T3 are connected to the output OUT1.

FIG. 4A shows the case where the control bit SEL01 is 0, that is the circuit ground or a low level of voltage, and FIG. 4B shows the case where the control bit SEL01 is 1, that is a level of voltage high enough to switch the transistors ON. The equipotentials at low level are indicated by thin lines and the equipotentials at high level are indicated by thicker lines.

In FIG. 4A, the transistors T3 and T4 are ON whereas the transistors T1 and T2 are OFF. Consequently, the ranks of the signals IS0 and IS1 are reversed at the output of block SCT0:1. Thus, the signal IS1 is applied at the input of the processing circuit CT0 and the signal IS0 is applied at the input of the processing circuit CT1. At the output of the circuits CT0, CT1, the output signals OS0 and OS1 are in the same order as the signals IS0, IS1 as applied to the processing circuits, so that the signal OS1 is applied to the input IN0 of the block DSCT0:1 whereas the signal OS0 is applied to the input IN1 of the block DSCT0:1.

As the same control bit SEL01 is applied to the blocks SCT0:1 and DSCT0:1, the transistors T3 and T4 of the block DSCT0:1 are also ON, whereas the other transistors are OFF. Consequently, the signal OS1 applied to the input IN0 is copied out by the output OUT1 of the block DSCT0:1, whereas the signal OS0 applied to the input IN1 is copied out by the output OUT0 of the block DSCT0:1. The signals OS0 and OS1 are therefore supplied according to the ranks of the corresponding input signals IS0 and IS1.

Those skilled in the art will note that the transistors T1, T3 form a first multiplexer circuit and that the transistors T2, T4 form a second multiplexer circuit. Thus, each block SCT0:1, DSCT0:1 is the equivalent of two linked multiplexers with their outputs interconnected.

Figure 5:
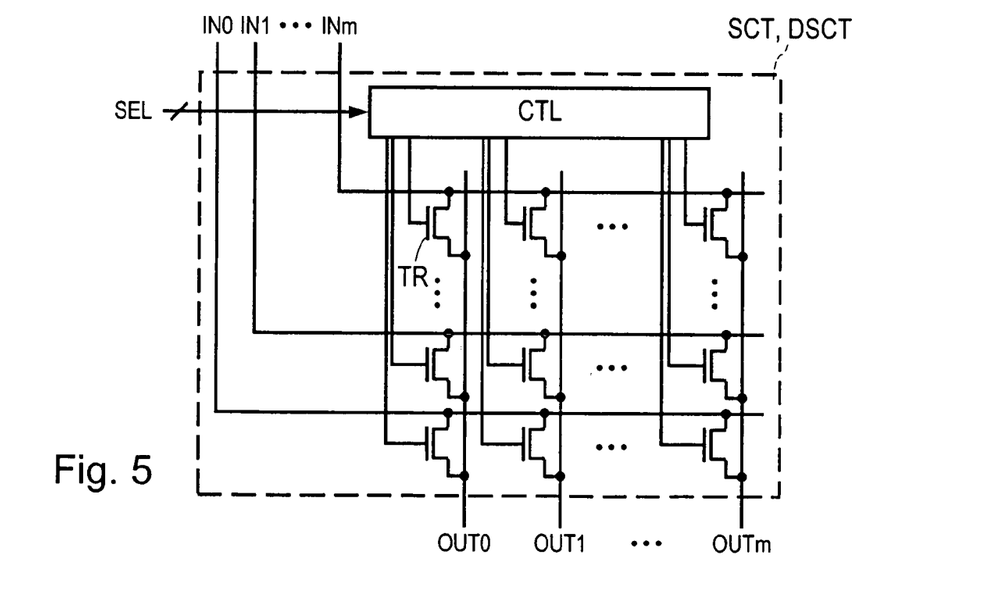
FIG. 5 shows an embodiment of the permutation circuits of FIG. 2 without juxtaposition of permutation blocks.

FIG. 5 represents a second embodiment of permutation circuits SCT, DSCT of FIG. 2 without juxtaposition of permutation blocks. Each permutation circuit SCT, DSCT comprises here m×m transistors TR, for example NMOS transistors, arranged in lines and columns according to a matrix distribution of m lines and m columns, m being the number of processing circuits CT0-CTm.

The drain terminals of the transistors of each line are respectively connected to an input IN0-INm of the permutation circuit, whereas the source terminals of the transistors of each column are respectively connected to an output OUT0-OUTm of the circuit. The gates of the transistors are separately controlled by a control circuit CTL. To perform permutations, the control circuit CTL controls the transistors T so that only one transistor is ON by line and by column of transistors. The number of permutations in an organized set of m+1 elements being equal to (m+1)! (factorial m+1), the control signal SEL supplied by the control circuit ISGEN comprises the number of bits necessary to code (m+1)!. For example, for 8 processing circuits (m=7), the number of possible permutations is equal to 8! (40320) and the control signal therefore comprises 16 bits.

Those skilled in the art will note that the control circuits CTL of the two permutation circuits SCT, DSCT can be provided different so as to perform reverse permutations from the same control signal SEL. The control circuits CTL can also be identical and receive control signals SEL(SCT) and SEL(DSCT) which are different but linked, the circuit ISGEN therefore ensuring the provision of the random or pseudo-random signal SEL(SCT) and the provision of the signal SEL(DSCT) so that the circuit DSCT performs a permutation which neutralizes the one performed by the circuit SCT, with a possible reorganization of output signals according to an invariable order different from the order of input signals.

Figure 6:
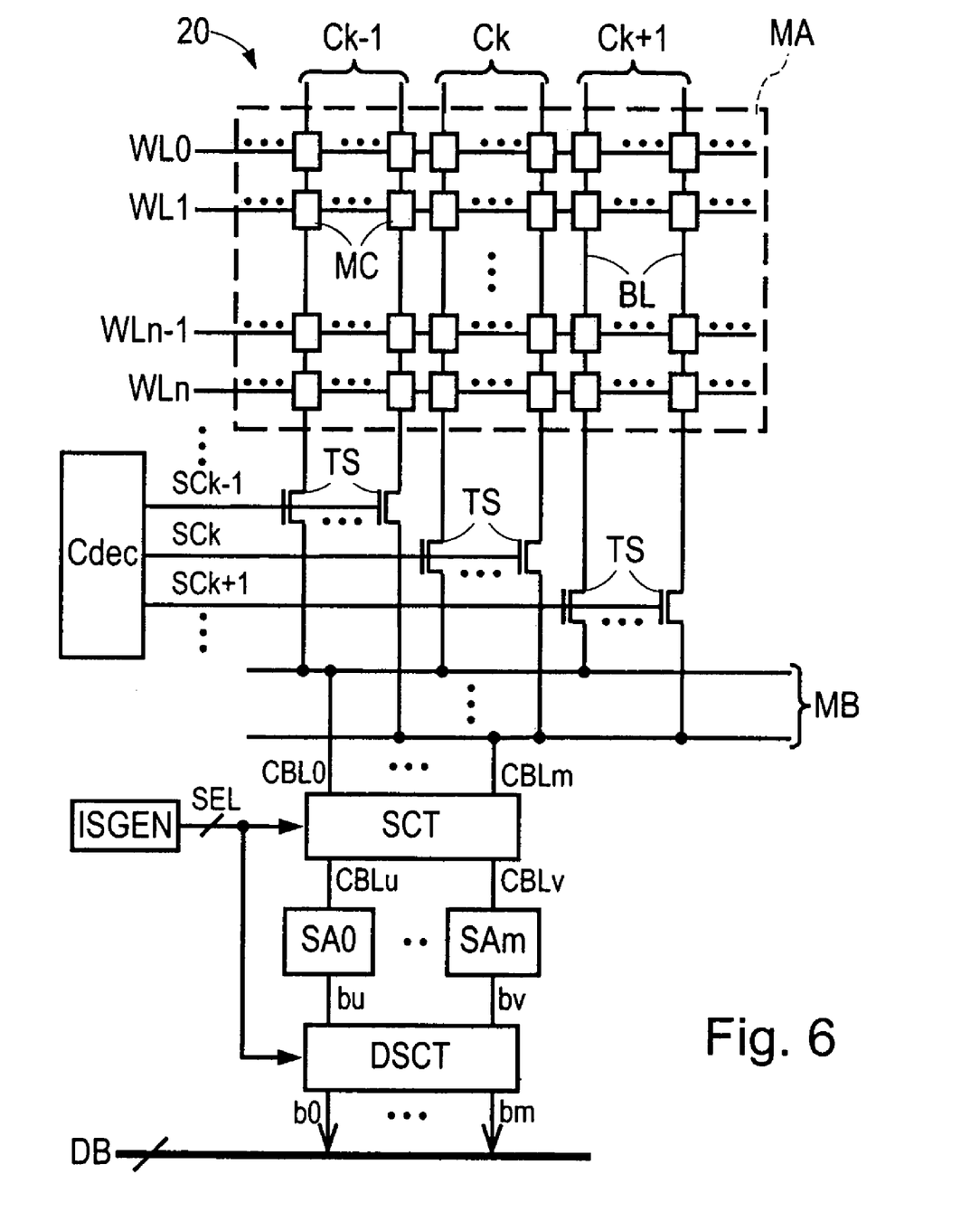
FIG. 6 schematically shows a memory fitted with a processing device according to the invention.

FIG. 6 shows an application of the present invention to a memory 20 wherein the permutation circuits SCT, DSCT and the control circuit ISGEN described above have been integrated.

The memory 20 is for example of EEPROM or FLASH type and comprises a memory array MA comprising electrically erasable and programmable memory cells MC. The memory cells MC are connected to horizontal word lines WL0-WLn and vertical bit lines BL. The bit lines are gathered into columns Ck-1, Ck, Ck+1, each comprising m+1 bit lines BL, m+1 being the number of bits by column, and k being a column index. The memory array thus defines, along word lines WL0-WLn, binary words of m+1 bits each.

The memory 20 also comprises m+1 sense amplifiers SA0-SAm able to read a binary word of m+1 bits in one read cycle. Each bit line BL is linked to a sense amplifier by means of a selection transistor TS and a multiplexing bus MB. A column decoder Cdec supplies column selection signals SCk-1, SCk, SCk+1 which are applied to the gates of the transistors TS. The transistors TS ensuring the selection of the bit lines of a same column are driven by the same signal SCk. Thus, upon selection of a word line WLi (i being an integer between 0 and n, n being the number of word lines in the memory array) and a column Ck, the sense amplifiers SA0-SAm read the m+1 memory cells MC of the selected word of rank i,k. To that purpose, they receive via the bus MB, signals CBL0-CBLm representative of the state of conductivity of the selected memory cells to which they are linked, and supply data bits b0-bm on a data bus DB. As it is well known from those skilled in the art, in a memory of EEPROM or FLASH type, the signals CBL0-CBLm are usually currents whose magnitude depends on the state of conductivity of memory cells, the state of conductivity of memory cells being representative of the data they store.

The permutation circuit SCT according to the invention is arranged between the multiplexing bus MB and the inputs of the sense amplifiers SA0-SAm and, as previously, is driven by the control signal SEL supplied by the circuit ISGEN. The circuit ISGEN supplies a new control signal SEL every T read cycles of a word out of the memory, for example at each new read cycle (T=1). As previously, the signal SEL is preferably random or pseudo-random in order not to be predictable. The number of T read cycles during which the control signal remains invariant can also be variable with time, as explained above.

Thus, the ranks 0-m of the signals CBL0-CBLm do not necessarily correspond to the ranks of the amplifiers SA0-SAm. Thus, in the example shown in FIG. 6, the signal CBLu of rank u is applied to the amplifier SA0, and the signal CBLv of rank v to the amplifier SAm, u and v being integers comprised between 0 and m which are not necessarily equal to 0 and m, respectively.

The second permutation circuit DSCT is arranged at the output of the amplifiers SA0-SAm to reorganize the bits b0-bm according to an invariant order corresponding to the rank of the memory cells or according to an invariant order not related to the rank of memory cells (for example if the memory cells receiving the bits of a same binary word are interlaced or randomly arranged in the memory array).

Those skilled in the art will note that in the permutation circuits SCT, DSCT previously described, the signals interlacing paths only comprise one transistor T1-T4, TR (FIGS. 4A, 4B, 5), so that the analogical signals CBL0-CBLm supplied by the memory cells or the digital signals b0-bm supplied by the sense amplifiers are not altered when passing through these circuits. Some precautions within the reach of those skilled the art can also be provided, for example switching ON the transistors of the circuits SCT, DSCT by applying them a gate voltage at least equal to the sum of the maximum voltage of the signals passing through them and the threshold voltage of these transistors.

In the light of the examples described above, it will be clear to those skilled in the art that the method and device according to the invention are susceptible to several variations of implementation. Thus, the permutation of the output signals performed upstream of the processing circuits, in particular the permutation of the bits b0-bm supplied by the sense amplifiers, can be performed by an external device which then receives the output signals in no particular order, for example an external microprocessor which uses the memory. The signal SEL which controls the first permutation is then supplied to the external device, for example by means of a specific output of the memory, so that the external device can reorganize the output signals in the desired order. Alternately, the control signal SEL can be supplied by the external device by providing a specific input linked to the control input of the permutation circuit SCT.

In addition, the number of input signals and the number of processing circuits are not necessarily identical. Thus, the number of processing circuits can be superior to the number of input signals in order to perform for example a redundant architecture wherein each input signal can be simultaneously processed by several processing circuits. It can also be unnecessary to process all the signals at each processing cycle or step, as may be the case in the memory previously described, where only the memory cells corresponding to a word are read during a read cycle. In that case, the number of signals susceptible to being processed can be superior to the number of processing circuits.

The method and the device according to the invention are also susceptible to several applications, and globally apply to any device comprising parallel processing circuits like the analog-to-digital converter or the monitoring device mentioned above.

The invention claimed is:

1. A reading method, comprising:
   selecting memory cells within a memory,
   applying electrical signals, each being representative of a state of one of the selected memory cells, to memory cell read circuits arranged to read the selected memory cells in parallel and supply a binary output signal each, representative of the state of the memory cell to which it is linked, each electrical signal having a determined rank, and
   modifying a rule for allocating the electrical signals to the read circuits, so that each read circuit processes electrical signals of different ranks during different reading cycles.

2. The method according to claim 1, wherein the allocation rule is randomly or pseudo-randomly modified every T reading cycles in order not to be predictable, T being a constant or variable integer superior or equal to 1.

3. The method according to claim 1, wherein the number of read circuits is equal to the number of electrical signals to be processed, each read circuit being allocated to the processing of one electrical signal only at each reading cycle, without read circuits redundancy.

4. The method according to claim 1, wherein the step of modifying the allocation rule comprises a step of applying a first permutation to at least one part of the electrical signals to be processed.

5. The method according to claim 4, wherein:
   the read circuits supply output signals, each of a determined rank; and
   the step of modifying the allocation rule comprises a step of applying a second permutation to the output signals, to organize the output signals in a predetermined invariant order.

6. The method according to claim 4, wherein the first permutation is performed by multiplexers.

7. The method according to claim 1, comprising steps of:
   defining groups of electrical signals and groups of read circuits, each group of read circuits being allocated to the processing of a group of signals;
   defining, within each group of electrical signals, a rule for allocating each electrical signal of the group to one read circuit of the group of read circuits allocated to the group of signals; and
   modifying the rule for allocating electrical signals within at least one group of signals between two different reading cycles.

8. The method according to claim 7, wherein the number of read circuits in each group of read circuits is equal to the number of electrical signals in each group of electrical signals, each group of read circuits being allocated to the processing of a group of electrical signals without redundancy of read circuits.

9. The method according to claim 1, comprising:
   providing permutable electrical paths between the memory cells and the read circuits, applying a first permutation to at least one part of the electrical paths, to modify the order in which the selected memory cells are linked to the read circuits, and applying a second permutation to the output signals supplied by the read circuits, so that the output signals are supplied in a predetermined invariant order.

10. A method for reading data from a memory comprising:

selecting a plurality of memory cells to be read, each memory cell supplying an electrical signal representative of a data value of the cell;

routing the electrical signal to respective read circuits according to a routing rule; and modifying the routing rule between read cycles.

11. The method according to claim 10 wherein the routing rule is modified every T read cycles.

12. The method according to claim 10 wherein T is a constant.

13. The method according to claim 10 wherein T is a variable.

14. The method according to claim 10 comprising:

routing the electrical signals to the read circuits via a first multiplexer; and modifying the routing rule via a selection signal sent to the first multiplexer.

15. The method according to claim 14 wherein each read circuit supplies an output signal to a second multiplexer, the second multiplexer being configured to output the signals in a predetermined order based on the selection signal.

16. A method comprising:

reading in parallel, using a plurality of read circuits, selected memory cells according to a rule for allocating electrical signals to the read circuits;

supplying binary output signals from the read circuits, respectively, based on the reading; and applying a permutation to at least one part of the electrical signals to the read circuits and modifying the rule for allocating electrical signals to the read circuits, the rule being modified between successive reading cycles.

17. The method according to claim 16, wherein the number of read circuits is equal to the number of electrical signals to be processed, each read circuit processing one electrical signal only at each reading cycle, without redundancy of read circuits.

18. The method according to claim 16, wherein the applying includes modifying the rule randomly or pseudo-randomly every T reading cycles.

19. The method according to claim 18, wherein T is a variable integer, superior or equal to 1.

20. The method according to claim 16, wherein the permutation is a first permutation, the method further comprising:

organizing the output signals in an invariant order by applying a second permutation to the output signals.

21. The method according to claim 16, further comprising:

defining groups of the electrical signals and groups of the read circuits, each group of read circuits being allocated to the processing of a corresponding group of the groups of electrical signals;

defining, within each group of electrical signals, a rule for allocating each electrical signal of the group to one read circuit of the group of read circuits allocated to the group of electrical signals; and modifying the rule for allocating electrical signals within at least one group of signals between two different reading cycles.

22. The method according to claim 21, wherein the number of read circuits in each group of read circuits is equal to the number of electrical signals in each group of electrical signals, each group of read circuits being allocated to the processing of a group of electrical signals without redundancy of read circuits.

23. The method according to claim 2 wherein T is a variable.

* * * * *

UNITED STATES PATENT AND TRADEMARK OFFICE
CERTIFICATE OF CORRECTION

PATENT NO. : 7,609,568 B2  Page 1 of 1
APPLICATION NO. : 11/493865
DATED : October 27, 2009
INVENTOR(S) : Lisart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 371 days.

Signed and Sealed this

Twelfth Day of October, 2010

David J. Kappos
*Director of the United States Patent and Trademark Office*